(12) United States Patent
Biskeborn et al.

(10) Patent No.: US 8,913,340 B2
(45) Date of Patent: Dec. 16, 2014

(54) SYSTEMS AND METHODS FOR WRITING SERVO PATTERNS

(75) Inventors: Robert Glenn Biskeborn, Hollister, CA (US); Wayne Isami Imaino, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1492 days.

(21) Appl. No.: 12/141,363

(22) Filed: Jun. 18, 2008

(65) Prior Publication Data

US 2009/0316290 A1    Dec. 24, 2009

(51) Int. Cl.
| G11B 21/02 | (2006.01) |
| G11B 15/46 | (2006.01) |
| G11B 5/09  | (2006.01) |
| G11B 17/00 | (2006.01) |
| G11B 5/584 | (2006.01) |

(52) U.S. Cl.
CPC .................................. *G11B 5/584* (2013.01)
USPC ........... 360/75; 360/73.04; 360/48; 360/72.3; 360/77.12

(58) Field of Classification Search
None
See application file for complete search history.

(56) References Cited

U.S. PATENT DOCUMENTS

| 4,176,381 | A  |   | 11/1979 | de Niet et al. ................... 360/77 |
| 4,408,240 | A  |   | 10/1983 | Pastore ........................... 360/121 |
| 4,975,791 | A  |   | 12/1990 | Eggebeen .................... 360/77.01 |
| 4,979,051 | A  |   | 12/1990 | Eggebeen ....................... 360/21 |
| 5,294,803 | A  |   | 3/1994  | Pahr ............................... 250/561 |
| 5,600,505 | A  | * | 2/1997  | Ayres ........................... 360/77.12 |
| 5,689,384 | A  |   | 11/1997 | Albrecht et al. ............ 360/77.12 |
| 6,021,013 | A  |   | 2/2000  | Albrecht et al. ................ 360/53 |
| 6,282,051 | B1 |   | 8/2001  | Albrecht et al. ................ 360/75 |
| 6,288,870 | B1 |   | 9/2001  | Saliba |
| 6,417,729 | B1 |   | 7/2002  | Lemay et al. |
| 6,542,325 | B1 |   | 4/2003  | Molstad et al. ............ 360/77.12 |
| 6,700,729 | B1 |   | 3/2004  | Beck et al. |
| 6,879,457 | B2 |   | 4/2005  | Eaton et al. ..................... 360/75 |
| 6,943,979 | B2 |   | 9/2005  | Goker et al. ................ 360/77.12 |
| 7,072,133 | B1 |   | 7/2006  | Yip et al. |
| 7,119,976 | B2 |   | 10/2006 | Biskeborn et al. ............. 360/53 |
| 7,136,255 | B2 |   | 11/2006 | Mahnad et al. ............ 360/77.12 |
| 7,149,050 | B2 |   | 12/2006 | Saliba et al. ............... 360/77.12 |
| 7,184,233 | B2 |   | 2/2007  | Zweighaft ...................... 360/51 |
| 7,322,096 | B2 |   | 1/2008  | Biskeborn et al. ......... 29/603.16 |
| 7,379,258 | B2 | * | 5/2008  | Nakao et al. .................... 360/75 |
| 7,450,341 | B2 |   | 11/2008 | Dugas et al. |
| 7,570,450 | B2 |   | 8/2009  | Koeppe |
| 7,839,605 | B2 |   | 11/2010 | Parker |

(Continued)

OTHER PUBLICATIONS

U.S. Appl. No. 12/141,375, filed Jun. 18, 2008.

*Primary Examiner* — Andrew L Sniezek
(74) *Attorney, Agent, or Firm* — Zilka-Kotab, PC

(57) ABSTRACT

A method for writing a servo track according to one embodiment comprises monitoring a lateral position of a magnetic tape passing over a servo writing head during a servo track writing operation; and writing servo marks to the magnetic tape, a timing of the writing of each mark being based on the monitored position of the magnetic tape. A system for writing a servo track according to one embodiment comprises a servo writing head for writing servo marks onto a magnetic tape; a device for optically monitoring a position of the magnetic tape during a servo track writing operation; and a controller for controlling a timing of the writing of the servo marks to the magnetic tape based on the monitored position of the magnetic tape. Additional systems and methods are also presented.

20 Claims, 7 Drawing Sheets

(56) References Cited

U.S. PATENT DOCUMENTS

| | | |
|---|---|---|
| 8,310,784 B2 | 11/2012 | Biskeborn et al. |
| 8,526,138 B2* | 9/2013 | Biskeborn et al. ............ 360/121 |
| 2002/0186497 A1* | 12/2002 | Nakao et al. ............... 360/77.13 |
| 2005/0234483 A1 | 10/2005 | Yencho et al. ................ 606/153 |
| 2007/0047146 A1 | 3/2007 | Biskeborn et al. ............ 360/240 |
| 2007/0121240 A1* | 5/2007 | Duran ............................. 360/75 |
| 2008/0239559 A1* | 10/2008 | Goker et al. ............... 360/77.12 |

* cited by examiner

SYSTEMS AND METHODS FOR WRITING SERVO PATTERNS

FIELD OF THE INVENTION

The present invention relates to data storage, and more particularly, this invention relates to systems and methods for writing servo patterns on a magnetic data storage medium.

BACKGROUND OF THE INVENTION

In magnetic storage systems, data is read from and written onto magnetic recording media utilizing magnetic transducers commonly. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

In a tape drive system, magnetic tape is moved over the surface of the tape head at high speed. This movement generally entrains a film of air between the head and tape. Usually the tape head is designed to minimize the spacing between the head and the tape. The spacing between the magnetic head and the magnetic tape is crucial so that the recording gaps of the transducers, which are the source of the magnetic recording flux, are in near contact with the tape to effect efficient signal transfer, and so that the read element is in near contact with the tape to provide effective coupling of the magnetic field from the tape to the read element.

Magnetic tape may use a written servo pattern to indicate lateral position on tape. This servo pattern is used to indicate lateral position, on tape, of the various written tracks. The servo pattern is not perfect due to variations in tape velocity and lateral position in the servo writer during servo writing. This can partly be attributed to the inability of most mechanical head positioning motors to react to tape lateral position changes fast enough to move the head into proper position to write the servo pattern. The component of the servo pattern due to the velocity variations and lateral motion is termed the 'written in' component and limits the accuracy of the track-following actuator in the drive. This is due to the high frequency components of the 'written in' servo which the track-following actuator has difficulty in following. Greater track-following accuracy becomes more important as written tracks get narrower. Hence 'written in' servo noise limits the ultimate track pitch attainable in magnetic tape recording.

SUMMARY OF THE INVENTION

A method for writing a servo track according to one embodiment comprises monitoring a lateral position of a magnetic tape passing over a servo writing head during a servo track writing operation; and writing servo marks to the magnetic tape, a timing of the writing of each mark being based on the monitored position of the magnetic tape.

A method for writing a servo track according to another embodiment comprises optically monitoring a lateral position of a magnetic tape passing over a servo writing head during a servo track writing operation; monitoring a velocity of the magnetic tape relative to the head; writing servo marks to the magnetic tape, wherein the servo marks are magnetically defined bars arranged in base sets, each base set comprising at least two bars oriented at different angles with respect to a direction of tape travel; adjusting a timing of the writing of each mark based on the monitored position of the magnetic tape; and further adjusting the timing of the writing of each mark based on the monitored velocity of the magnetic tape.

A method for writing a servo track according to yet another embodiment comprises reading a previously-written servo pattern on a magnetic tape; monitoring a lateral position of a magnetic tape during the reading; deducing written in noise in the servo pattern; and writing servo marks to the magnetic tape over the written in noise.

A system for writing a servo track according to one embodiment comprises a servo writing head for writing servo marks onto a magnetic tape; a device for optically monitoring a position of the magnetic tape during a servo track writing operation; and a controller for controlling a timing of the writing of the servo marks to the magnetic tape based on the monitored position of the magnetic tape.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

The following description discloses several preferred embodiments of tape-based storage systems, as well as operation and/or component parts thereof.

In one general embodiment, a method for writing a servo track comprises monitoring a lateral position of a magnetic tape passing over a servo writing head during a servo track writing operation and writing servo marks to the magnetic tape, a timing of the writing of each mark being based on the monitored position of the magnetic tape.

In another general embodiment, a method for writing a servo track comprises optically monitoring a lateral position of a magnetic tape passing over a servo writing head during a servo track writing operation and monitoring a velocity of the magnetic tape relative to the head. Also, this method includes writing servo marks to the magnetic tape, wherein the servo marks are magnetically defined bars arranged in base sets, each base set comprising at least two bars oriented at different angles with respect to a direction of tape travel. In addition, this method includes adjusting a timing of the writing of each mark based on the monitored position of the magnetic tape and further adjusting the timing of the writing of each mark based on the monitored velocity of the magnetic tape.

In another general embodiment, a method for writing a servo track comprises reading a previously-written servo pattern on a magnetic tape and monitoring a lateral position of a magnetic tape during the reading. Also, this method includes deducing written in noise in the servo pattern and writing servo marks to the magnetic tape over the written in noise.

In another general embodiment, a system for writing a servo track comprises a servo writing head for writing servo marks onto a magnetic tape. Also, this system includes a device for optically monitoring a position of the magnetic tape during a servo track writing operation and a controller for controlling a timing of the writing of the servo marks to the magnetic tape based on the monitored position of the magnetic tape.

Figure 1:
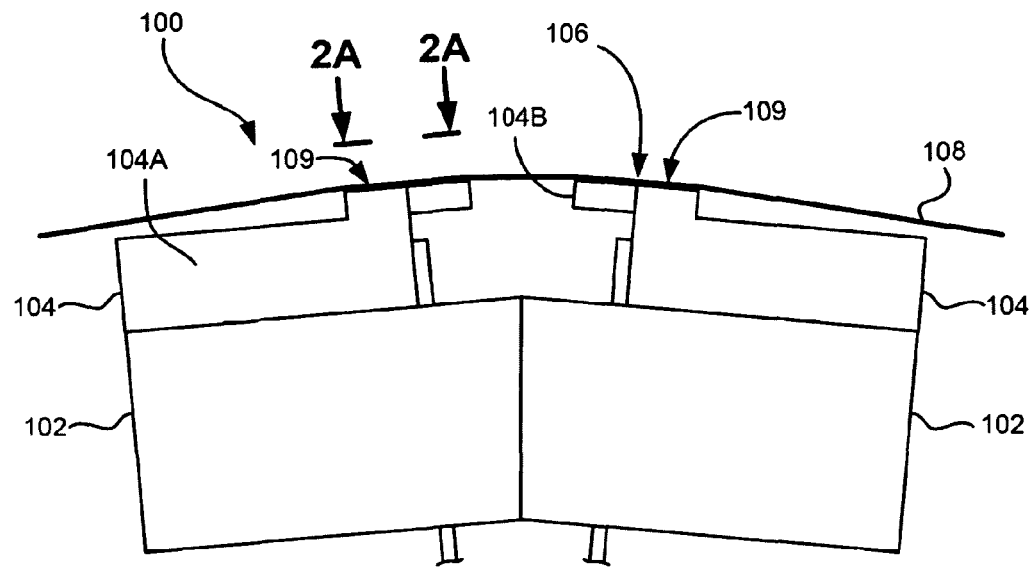
FIG. 1 illustrates a flat-lapped magnetic tape head, in accordance with one embodiment of the present invention.

FIG. 1 illustrates a flat-lapped bi-directional, two-module magnetic tape head 100, in accordance with one embodiment of the present invention. As shown, the head includes a pair of bases 102, each equipped with a module 104. The bases may be "U-beams" that are adhesively coupled together. Each module 104 includes a substrate 104A and a closure 104B with readers and writers 106 situated therebetween. In use, a tape 108 is moved over the modules 104 along a tape bearing surface 109 in the manner shown for reading and writing data on the tape 108 using the readers and writers 106. Conventionally, a partial vacuum is formed between the tape 108 and the tape bearing surface 109 for maintaining the tape 108 in close proximity with the readers and writers 106.

The substrates 104A are typically constructed of a wear resistant material, such as a ceramic. The closures 104B may be made of the same or similar ceramic as the substrates 104A.

The readers and writers 106 may be arranged in a piggyback configuration. The readers and writers 106 may also be arranged in an interleaved configuration. Alternatively, each array of channels may be readers or writers only. Any of these arrays may contain one or more servo readers.

Figure 2B:
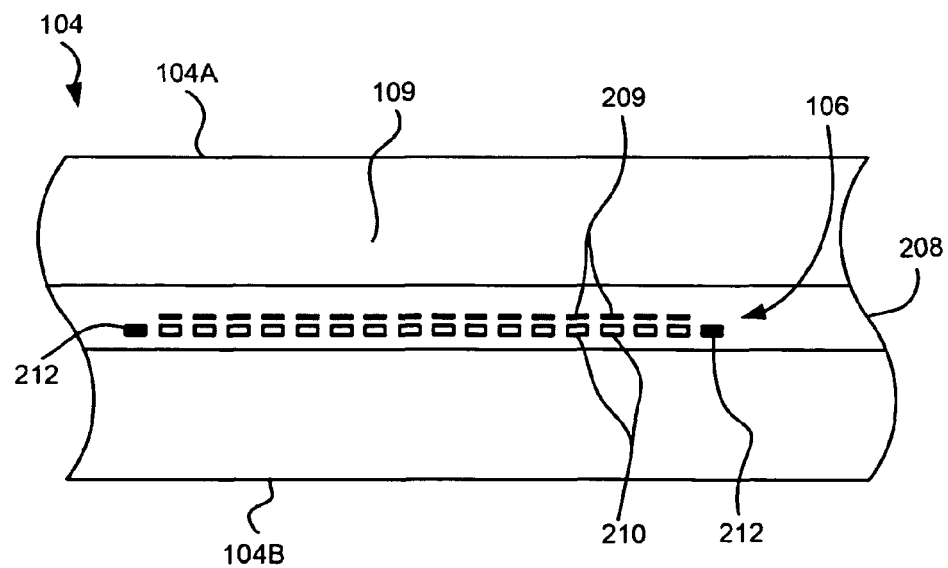
FIG. 2B is a detailed view taken from Circle 2B of FIG. 2A.
Figure 2A:
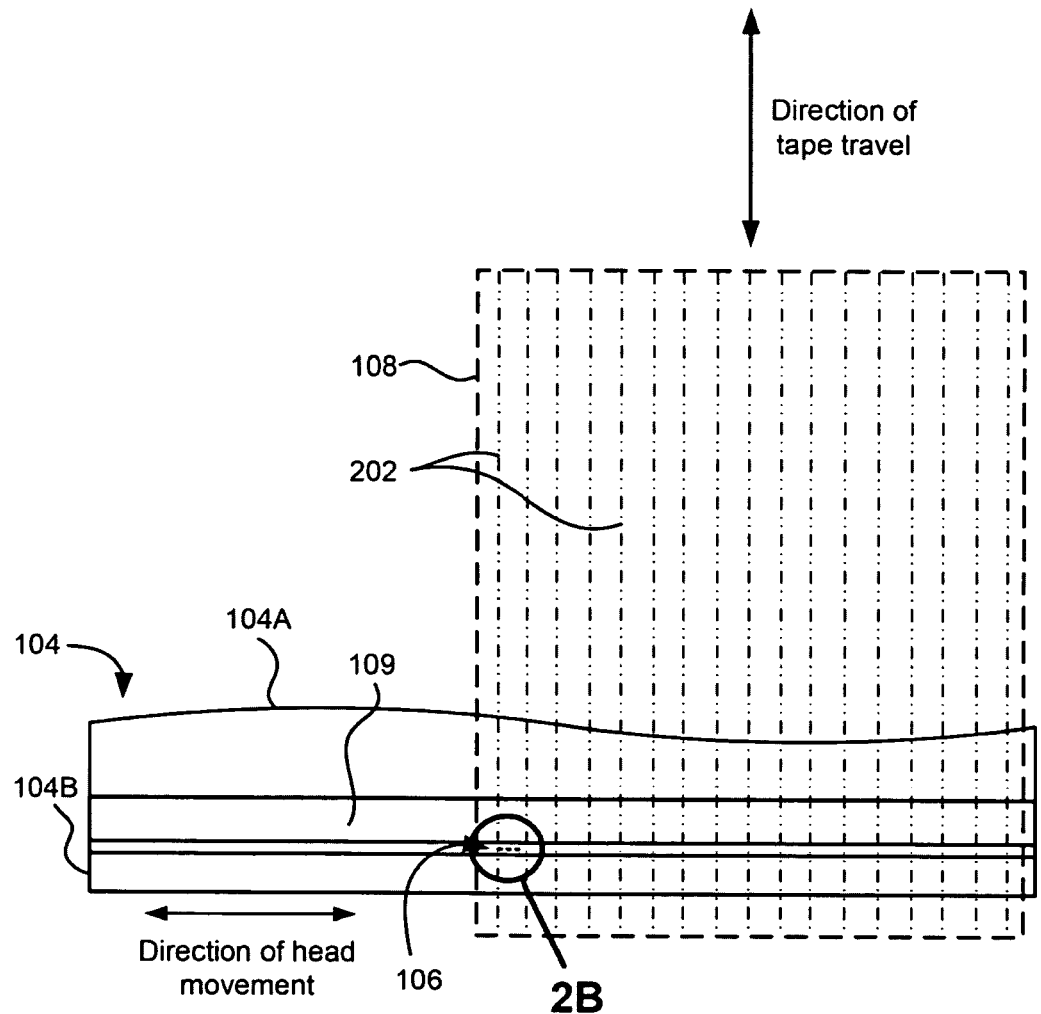
FIG. 2A is a tape bearing surface view taken from Line 2A of FIG. 1.

FIG. 2A illustrates the tape bearing surface 109 of one of the modules 104. A representative tape 108 is shown in dashed lines. The module 104 is preferably long enough to be able to support the tape as the head steps between data bands.

In this example, the tape 108 includes 4-22 data bands, e.g., with 16 data bands and 17 servo tracks 202, as shown in FIG. 2A on a one-half inch wide tape 108. The data bands are defined between servo tracks 202. Each data band may include a number of data tracks, for example 96 data tracks (not shown). During read/write operations, the elements 106 are positioned within one of the data bands. Outer readers, sometimes called servo readers, read the servo tracks 202. The servo signals are in turn used to keep the elements 106 aligned with a particular track during the read/write operations.

FIG. 2B depicts a plurality of read and/or write elements 106 formed in a gap 208 on the module 104 of FIG. 2A. As shown, the array of elements 106 includes, for example, 16 writers 209, 16 readers 210 and two servo readers 212, though the number of elements may vary. Illustrative embodiments include 8, 16, 32, and 64 elements per array 106. A preferred embodiment includes 24 readers per array and/or 24 writers per array. This allows the tape to travel more slowly, thereby reducing speed-induced tracking and mechanical difficulties. While the readers and writers may be arranged in a piggyback configuration as shown in FIG. 2B, the readers 210 and writers 209 may also be arranged in an interleaved configuration. Alternatively, each array of elements 106 may be readers or writers only, and the arrays may contain one or more servo readers. As noted by considering FIGS. 1 and 2A-B together, each module 104 may include a complementary set of elements 106 for such things as bi-directional reading and writing, read-while-write capability, etc.

In preferred embodiments, the width of the servo head is such that transition broadening effects are minimized. Giant Magnetoresistive (GMR) and Tunneling Magnetoresistive (GMR) devices are preferably used in servo readers for advanced formats which require servo readers having small track widths such as 0.5 micrometers.

Figure 3A:
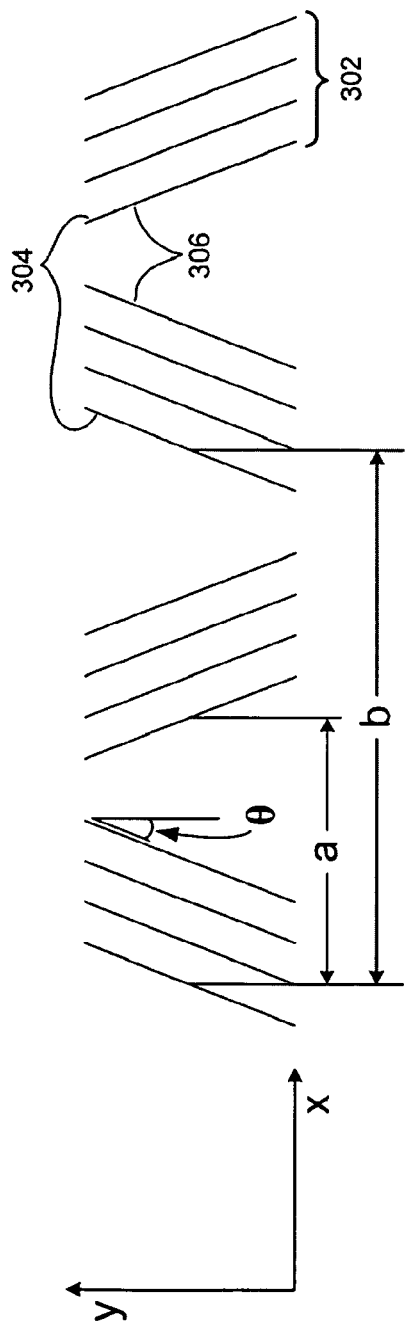
FIG. 3A is a representative diagram of a servo pattern according to one embodiment of the present invention.

A typical servo track in one embodiment, shown in FIG. 3A, includes repeating servo patterns 302. A typical servo pattern 302 includes one or more magnetically-defined base sets 304 (e.g., in a chevron shape: / \) of two or more magnetically-defined bars 306, which may be written concurrently. Servo patterns 302 may include groups of the base sets 304 nested with one another (e.g., ///\\\). In one embodiment of the present invention, the distance between the first bar in a group and the first bar in the next group, b, is equal to two times the distance between a base set, a. Note that the chevron-type servo pattern is one of many that can be used in various embodiments of the present invention. Other illustrative servo patterns include "M" type (/\/\, |\/|, /|\, etc.), "N" type (/\/, |/|, /|/, etc.), etc. The M or N type patterns may be preferable to simple two-bar chevron type servo patterns in some instances, such as where the N or M pattern contain parallel bars, thereby allowing the system to calculate more accurately a velocity of the tape.

Variations and combinations of the foregoing types of servo base sets are also possible. Also note that the bars need not all have identical direct or inverse angles.

For properly recording a servo pattern on a magnetic tape that will account for tape velocity and lateral position changes, the lateral position and velocity of the magnetic tape should be known.

As is well known the lateral position, y, indicated by the measurements of the times, $t_a$ and $t_b$ is given by Equation 1:

$$y = \frac{[(t_a/t_b)b_0 - a_0]}{2\tan\theta} \qquad \text{Equation 1}$$

where $a_0$ and $b_0$ are the distances between oppositely angled and parallel transitions respectively in the center of the servo band, a and b are the distances between oppositely angled and parallel transitions at a position y above or below the centerline, θ is the angle of the servo mark relative to the vertical, $t_a$ is the time it takes the magnetic tape to travel the distance of a, and $t_b$ is the time it takes the magnetic tape to travel the distance of b. An exemplary angle θ is in the range of >0° to about 10°, e.g., about 4° to about 6°.

To compensate for tape lateral motion of ΔY and an average velocity of $\bar{V}$, the second transition (forming the a distance) is preferably delayed by:

$$\Delta t = \frac{\Delta Y \tan\theta}{\bar{V}} \quad \text{Equation 2}$$

where the two generating gaps are separated by $a_0$ at the center of the servo band. Thus, for example, assuming θ=6°, if the tape moves up (toward the apex of the inverted V) by 2 microns, at a tape velocity of 4 meters per second, then the second transition is delayed by 52.55 nanoseconds.

The detection of the lateral motion and the velocity of the tape can be made optically through edge detection, interferometry at the tape edge, or laser Doppler anemometry of the tape surface.

Alternatively, the velocity of the tape can be determined by measuring the period of a series of high frequency timing marks previously written on the tape. Alternatively, a previously written servo pattern can be measured to deduce the written-in component and re-written to remove it. A series of servo readers in close proximity can be used to determine the written-in component, since for closely spaced servo readers, the lateral motion of the tape appears equally to all servo readers. The component of lateral motion that propagates with the velocity of the tape is due to the written-in servo marks and can be removed. The lateral motion as determined by each of the servo readers is comprised of two parts, one that appears equally to all readers and another component that appears time-shifted due to the propagation of the written-in mark. This time shift is:

$$T = \frac{\Delta X}{\bar{V}} \quad \text{Equation 3}$$

where ΔX is the distance between servo readers. Various methods, well known in the art, may be used to estimate the written-in component and this is subtracted from the lateral motion of the servo readers to yield an improved measurement of the lateral motion. This determination of the lateral motion is used in the equation above to re-servo write the servo band.

Another method to re-servo write tape reduces or eliminates track-following error. A previously written servo pattern is read and decoded to determine the lateral motion. This data is used to simulate the actuator response. The difference between the actuator response and the actual decoded lateral motion is the position error signal. This difference is removed from the lateral position that is re-servo written onto the tape, eliminating or reducing the track-following error.

In another approach, and with reference to FIG. 3A, the lateral position, when b=2a, may be given by Equation 4:

$$y = \frac{a}{2\tan\theta}\left[1 - 2\frac{t_a}{t_b}\right] \quad \text{Equation 4}$$

where y is the lateral position, a is the distance between a base set, b is the distance between servo mark groups, θ is the angle off vertical of the servo mark, $t_a$ is the time it takes the magnetic tape to travel the distance of a, and $t_b$ is the time it takes the magnetic tape to travel the distance of b.

In various embodiments, the angle θ (defined between a bar and a perpendicular line to the edge of the magnetic tape) is increased, thereby allowing a faster servo pattern repetition rate.

When a servo reader follows servo marks on a magnetic tape during a writing operation, any written in error will cause the head to move laterally on the magnetic tape when the tape is traveling straight (i.e., not moving laterally). This leads to the head moving off the data track and reducing the effectiveness of the writing process. By adjusting how the servo marks are written on the magnetic tape to take into account tape lateral position change and tape velocity change, the written in error can be reduced.

Figure 3B:
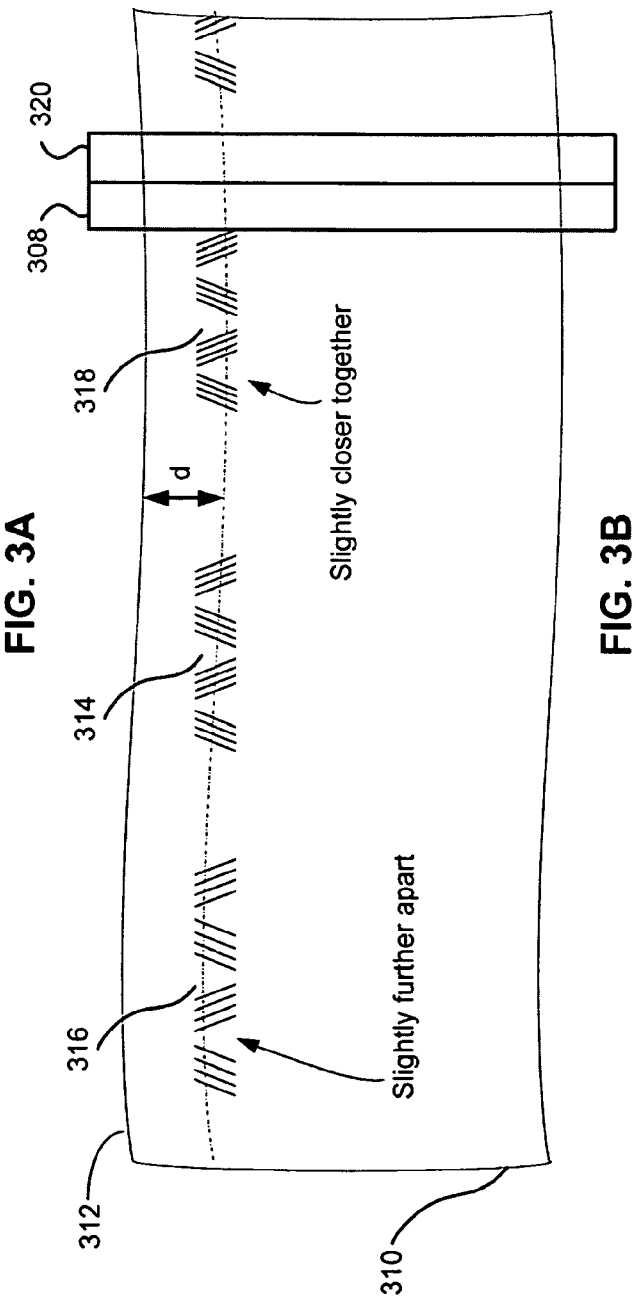
FIG. 3B illustrates a magnetic tape having servo patterns of different characteristics according to the positioning of the magnetic tape as determined by an optical detector according to one embodiment of the present invention.

FIG. 3B is an illustrative diagram of a magnetic tape 310 moving past a position detector 308 with representative servo marks 314, 316, 318 on a tape 310 designating servo marks written through different methods to correct for tape lateral position change and/or velocity changes.

In one approach, a servo writer 320 writes servo marks to the tape while the position detector 308 detects the position of the tape relative to the servo writer. The servo writer 320 may be stationary, i.e., is not actuated, or may move. The servo writer 320 may be a standard servo writer, a pair of servo writers, etc. The position detector 308 may be an optical position detector of a type known in the art, a mechanical device, etc.

For the present discussion, assume the servo writer 320 does not move. Because the servo writer 320 does not move, as the magnetic tape 310 changes position laterally, the servo marks are recorded on the magnetic tape closer or farther from the tape edge 312. To compensate for this positional change, as detected by the optical position detector 308, the spacing of the servo marks is adjusted such that, if a servo reader were to be constantly positioned at a distance d from the edge of the tape moving at a constant velocity, the spacing of the marks would appear to the servo sensor to be uniformly written under near-perfect conditions. For example, when the servo writer head is stationary during the servo writing operation, a timing control may be used to write the servo marks in the correct relative location on the magnetic tape to provide the foregoing effect.

Servo marks 316 are illustrative of marks that would be recorded to compensate for tape lateral movement that causes the servo writer to write the servo marks farther from the tape edge 312 than normal. To compensate for this positional change, the servo marks 316 are recorded slightly farther apart, so that when they are read by a servo reader in another operation, they direct the read head to travel straight instead of moving laterally to follow conventionally written servo marks. Likewise, servo marks 318 are illustrative of marks that would be recorded to compensate for tape lateral movement that causes the head to write the servo marks closer to the tape edge 312 than normal. Servo marks 314 are illustrative of normal marks written the proper distance from the tape edge 312.

In one approach, the distance between a base set, a, is increased to compensate for the tape 310 moving laterally causing the head to write the servo marks 316 farther from the tape edge 312 than normal.

In another approach, the distance between a base set, a, is decreased to compensate for the tape 310 moving laterally causing the head to write the servo marks 318 closer to the tape edge 312 than normal.

In another approach, a servo pattern may be "reconditioned." For example, a conventional servo written magnetic tape containing high frequency written in noise may be used. The servo pattern on this magnetic tape is mechanically tracked relative to the edge of the tape, and the servo pattern is analyzed to detect the written in component. In another approach, two or more servo readers could be used to accomplish the measuring by taking two position readings, and then correlating the lateral position measurements to deduce the written in component. A servo pattern with reduced written in noise may then be written over the existing servo pattern on the magnetic tape entirely or just on and around the portions of the servo pattern which have written in noise detected.

An advantage of writing a servo pattern 314 that appears to a tape drive system to follow the tape edge 312 precisely is increased bandwidth, since mechanical head motion is reduced or eliminated during a data writing operation. Also, hard edge guiding and associated high frequency lateral motion noise is reduced or eliminated.

In another embodiment, a servo pattern is repeatedly subjected to reading and rewriting operations to produce a more and more accurate servo pattern which appears to the system to follow the tape edge more precisely.

The servo track may have data embedded or encoded therein. Such data may include data for encryption, for ascertaining a longitudinal position along the tape, etc.

In one embodiment, the servo marks are written with a given height, and then an optional operation is performed to trim the servo marks to a desired height by using an erase head. The height is measured in a direction perpendicular to a length of the tape and parallel to the plane of the writing surface of the tape (e.g., in the y direction of FIG. 3A).

A small height of the data bands also provides more immunity to read/write problems associated with tape dimensional instability, i.e., lateral expansion.

Figure 4:
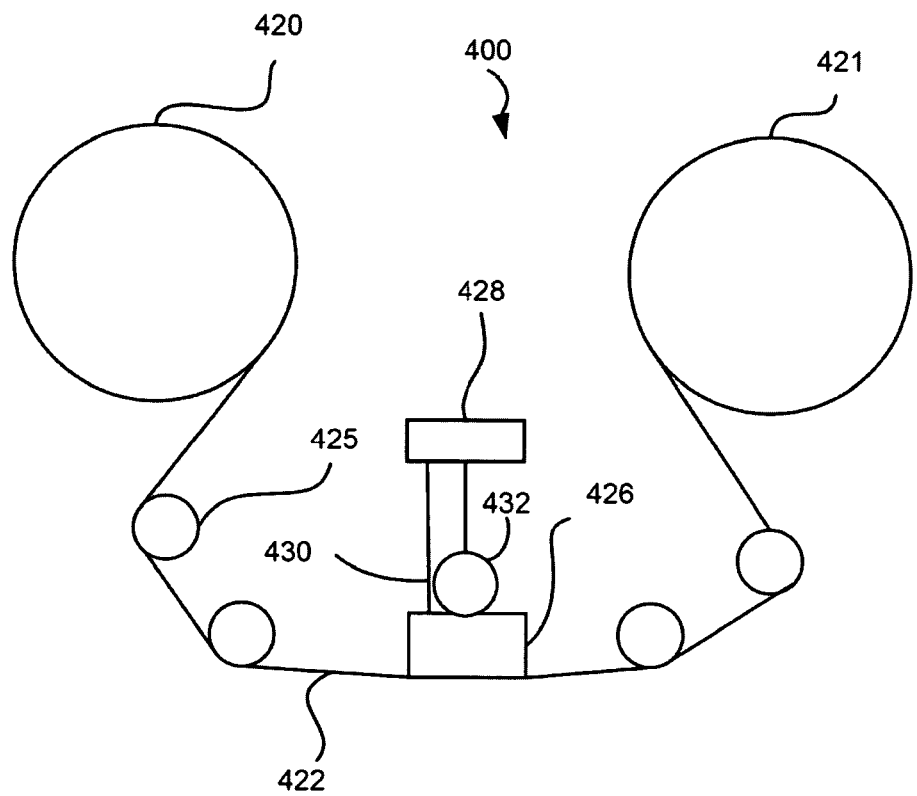
FIG. 4 is a schematic diagram of a tape drive system according to one embodiment of the present invention.

FIG. 4 illustrates a simplified tape drive 400 of a tape-based data storage system, which may be employed in the context of the present invention. While one specific implementation of a tape drive is shown in FIG. 4, it should be noted that the embodiments described herein may be implemented in the context of any type of tape drive system.

As shown, a tape supply cartridge 420 and a take-up reel 421 are provided to support a tape 422. One or more of the reels may form part of a removable cassette and are not necessarily part of the system 400. The tape drive, such as that illustrated in FIG. 4, may further include drive motor(s) to drive the tape supply cartridge 420 and the take-up reel 421 to move the tape 422 over a tape head 426 of any type.

Guides 425 guide the tape 422 across the tape head 426. Such tape head 426 is in turn coupled to a controller assembly 428 via a cable 430. The controller 428 typically controls head functions such as servo following, writing, reading, etc. The cable 430 may include read/write circuits to transmit data to the head 426 to be recorded on the tape 422 and to receive data read by the head 426 from the tape 422. An actuator 432 controls position of the head 426 relative to the tape 422.

An interface may also be provided for communication between the tape drive and a host (integral or external) to send and receive the data and for controlling the operation of the tape drive and communicating the status of the tape drive to the host, all as will be understood by those of skill in the art.

Figure 5:
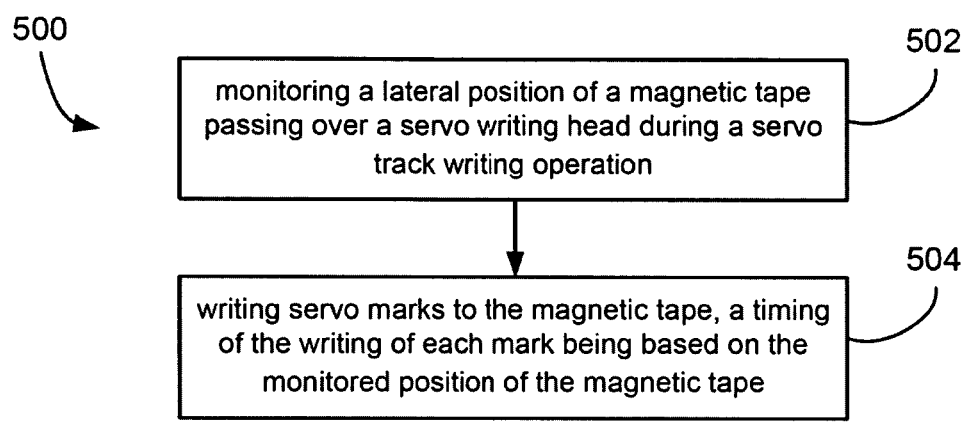
FIG. 5 is a flow diagram of a process according to one embodiment of the present invention.

FIG. 5 illustrates a method 500 according to one embodiment. As an option, the present method 500 may be implemented in the context of the functionality and architecture of FIGS. 1-4. However, method 500 may be carried out in any desired environment. It should be noted that the aforementioned definitions may apply during the present description.

With continued reference to FIG. 5, in operation 502, a lateral position of a magnetic tape passing over a servo writing head during a servo track writing operation is monitored. In one preferred embodiment, the lateral position is monitored with an optical device.

In operation 504, servo marks are written to the magnetic tape, with a timing of the writing of each mark being based on the monitored position of the magnetic tape. In one approach, each servo mark is individually written to the magnetic tape, rather than in pairs or groups. In another approach, pairs or groups of servo marks may be written simultaneously which may ensure a certain distance between the servo marks written simultaneously.

In one approach, the head containing the writers does not move during operation 504 or it moves to adjust for lateral position changes in the tape.

In another embodiment, a velocity of the magnetic tape is monitored relative to the head, wherein the timing of the writing of each mark is further based on the monitored velocity of the magnetic tape. The velocity of the magnetic tape can be monitored by an optical speed detector, by tracking the spindle speed feeding the magnetic tape, etc.

Another approach further comprises subsequently reducing a height of the written servo marks, the height of the written servo marks being measured in a direction perpendicular to a direction of tape travel.

In another approach, the head may be stationary during the servo writing operation or moved laterally during servo writing operation. When the head is stationary during the servo writing operation, the timing control is used to write the servo marks in the correct relative location on the magnetic tape.

In another approach, the servo marks may comprise a series of magnetically defined bars. Also, the servo track may comprise a series of base sets of magnetically defined bars. Each base set could comprise two, three, four or more bars, with at least two bars oriented at different angles with respect to a direction of tape travel. Further, an angle between at least some of the bars could be greater than 0 degrees and less than 180 degrees. Alternatively, an angle between at least some of the bars could be less than about 50 degrees, e.g., 0-50 degrees, 10-40 degrees, etc.

In another approach, multiple servo tracks may be written, where a distance between the servo tracks may be less than about 3 mm, e.g., 3±0.25 mm; less than about 1.5 mm; less than about 0.75 mm; less than about 0.5 mm; etc., though could be higher as well.

In a further approach, one of the servo tracks may have data encoded therein. Another approach optically monitors the lateral position of the magnetic tape.

Figure 6:
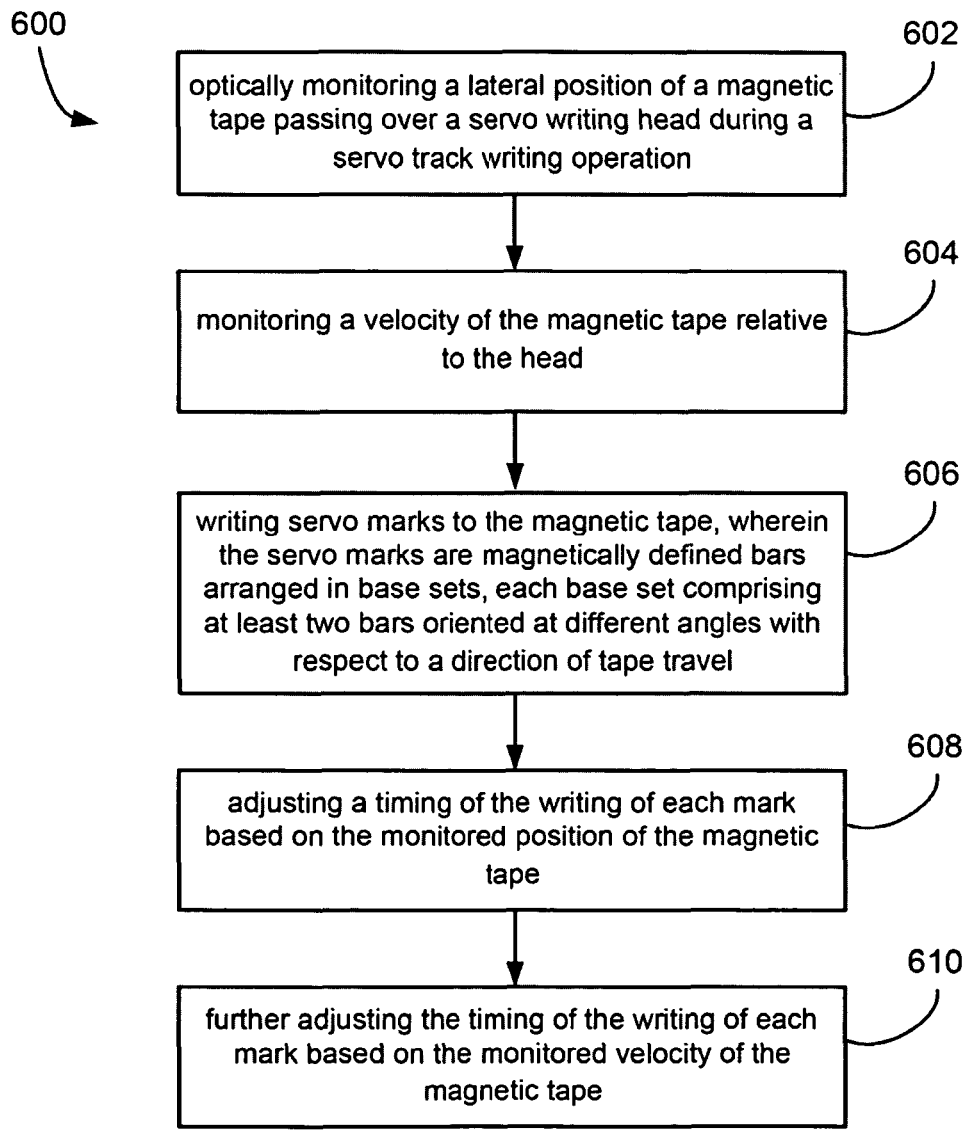
FIG. 6 is a flow diagram of a process according to one embodiment of the present invention.

FIG. 6 illustrates a method 600 according to one embodiment. As an option, the present method 600 may be implemented in the context of the functionality and architecture of FIGS. 1-4. However, method 600 may be carried out in any desired environment. It should be noted that the aforementioned definitions may apply during the present description.

With continued reference to FIG. 6, in operation 602, a lateral position of a magnetic tape passing over a servo writing head during a servo track writing operation is optically monitored. Any optical device capable of tracking the lateral position of the magnetic tape can be used to optically monitor the lateral position of the magnetic tape.

In operation 604, a velocity of the magnetic tape relative to the head is monitored. A speed sensing device can be used to monitor the velocity of the magnetic tape, such as a radio transmitting speed gun, laser transmitting speed gun, optical speed detector, spindle speed, etc.

In operation 606, servo marks are written to the magnetic tape, wherein the servo marks are magnetically defined bars arranged in base sets, each base set comprising at least two bars oriented at different angles with respect to a direction of tape travel. In this operation, the base sets of bars may contain 2, 3, 4 or more bars in each set.

In operation 608, the timing of the writing of each mark is adjusted based on the monitored position of the magnetic tape. In one embodiment, the marks are spaced slightly farther apart when the servo marks are placed farther from the tape edge, and are placed slightly closer together when the servo marks are placed closer to the tape edge.

In operation 610, the timing of the writing of each mark is further adjusted based on the monitored velocity of the magnetic tape. The velocity can be monitored by an optical device, spindle speed feeding the magnetic tape, etc.

In another approach, each servo mark is written individually to the magnetic tape. In other approaches, pairs or groups of servo marks may be simultaneously written to the magnetic tape.

Figure 7:
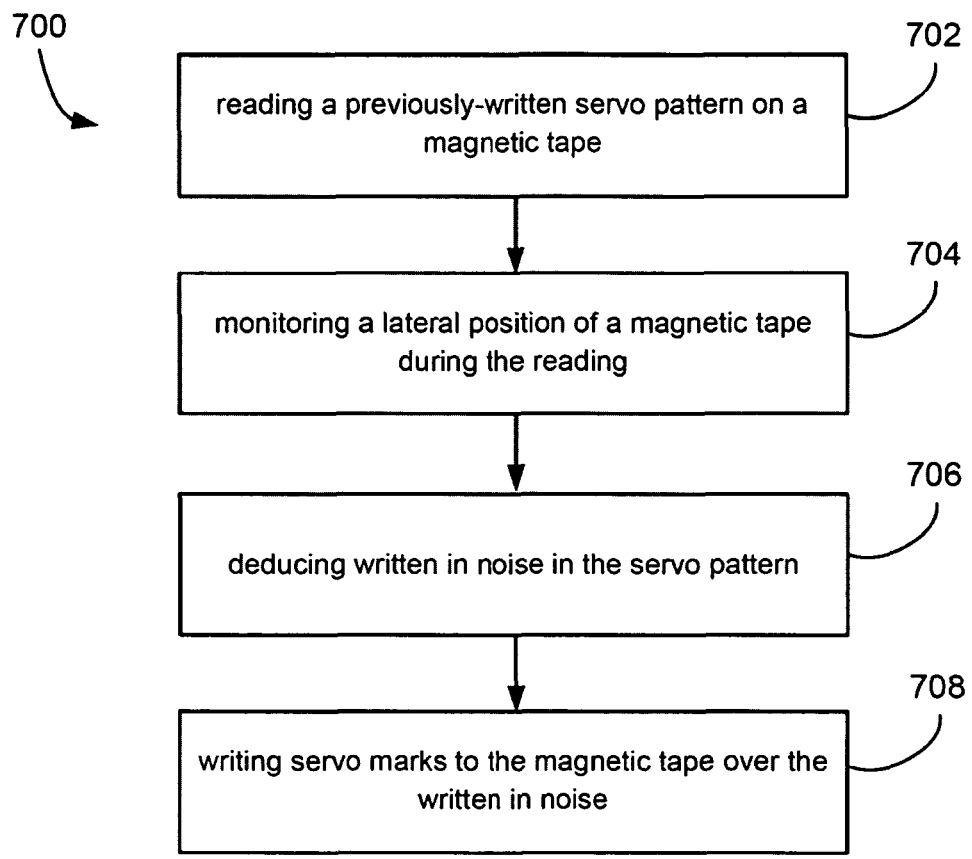
FIG. 7 is a flow diagram of a process according to one embodiment of the present invention.

FIG. 7 illustrates a method 700 according to one embodiment. As an option, the present method 700 may be implemented in the context of the functionality and architecture of FIGS. 1-4. However, method 700 may be carried out in any desired environment. It should be noted that the aforementioned definitions may apply during the present description.

With continued reference to FIG. 7, in operation 702, a previously written servo pattern on a magnetic tape is read. This previously written servo pattern could have been made according to the foregoing description, or the magnetic tape could have the servo pattern on it before coming into contact with this embodiment.

In operation 704, a lateral position of a magnetic tape is monitored during a reading operation. Any lateral position of a magnetic tape made be monitored, and examples include monitoring the inside edge of the magnetic tape, outside edge of the magnetic tape, the position of the data bands on the magnetic tape, etc. Any device capable of monitoring the lateral position can be used to do so including an optical position monitor, mechanical position monitor, etc.

In operation 706, written in noise in the servo pattern is deduced. Written in noise can occur due to the magnetic tape moving laterally when the servo pattern is written, velocity of the magnetic tape changing while writing the servo pattern, etc.

In operation 708, servo marks are written to the magnetic tape over the written in noise. When writing over the written in noise with new servo marks, only the portions of the servo pattern that are affected by written in noise may be written over, or those portions affected by written in noise and the surrounding areas may be written over, or all of the servo pattern may be written over with new servo marks.

In one particularly preferred approach, the system or method implements a servo write head such as that described in U.S. Pat. No. 8,310,784 to Biskeborn et al., which is herein incorporated by reference.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for writing a servo track, comprising:
monitoring a lateral position of a magnetic tape passing over a servo writing head during a servo track writing operation; and
writing servo marks to the magnetic tape, a timing of the writing of each mark being based on the monitored position of the magnetic tape.

2. A method as recited in claim 1, wherein each servo mark is individually written.

3. A method as recited in claim 1, further comprising monitoring a velocity of the magnetic tape relative to the head, wherein the timing of the writing of each mark is further based on the monitored velocity of the magnetic tape.

4. A method as recited in claim 1, further comprising subsequently reducing a height of the written servo marks, the height of the written servo marks being measured in a direction perpendicular to a direction of tape travel.

5. A method as recited in claim 1, wherein the head remains stationary during the servo track writing operation.

6. A method as recited in claim 1, wherein the servo marks comprise a series of magnetically defined bars, wherein the timing of the writing of each mark determines a spacing between consecutively-written marks in a direction parallel to a direction of tape travel across the head.

7. A method as recited in claim 6, wherein the servo marks comprise a series of base sets of magnetically defined bars, each base set comprising two bars oriented at different angles with respect to a direction of tape travel.

8. A method as recited in claim 6, wherein the servo track comprises a series of base sets of magnetically defined bars, each base set comprising three bars, each base set comprising at least two bars oriented at different angles with respect to a direction of tape travel.

9. A method as recited in claim 6, wherein the servo track comprises a series of base sets of magnetically defined bars, each base set comprising at least four bars, each base set comprising at least two bars oriented at different angles with respect to a direction of tape travel.

10. A method as recited in claim 1, wherein the head moves laterally during at least a portion of the servo track writing operation.

11. A method as recited in claim 1, wherein multiple servo tracks are written, wherein a distance between the servo tracks is less than about 3 mm.

12. A method as recited in claim 1, wherein multiple servo tracks are written, wherein a distance between the servo tracks is less than about 1.5 mm.

13. A method as recited in claim 1, wherein multiple servo tracks are written, wherein the distance between the servo tracks is less than about 0.75 mm.

14. A method as recited in claim 1, wherein one the servo tracks has data encoded therein.

15. A method as recited in claim 1, wherein the lateral position of the magnetic tape is optically monitored.

16. A method for writing a servo track, comprising:
optically monitoring a lateral position of a magnetic tape passing over a servo writing head during a servo track writing operation;
monitoring a velocity of the magnetic tape relative to the head;
writing servo marks to the magnetic tape, wherein the servo marks are magnetically defined bars arranged in base sets, each base set comprising at least two bars oriented at different angles with respect to a direction of tape travel;
adjusting a timing of the writing of each mark based on the monitored position of the magnetic tape; and
further adjusting the timing of the writing of each mark based on the monitored velocity of the magnetic tape.

17. A method as recited in claim 16, wherein each servo mark is individually written.

18. A system for writing a servo track, comprising:
- a servo writing head for writing servo marks onto a magnetic tape;
- a device for optically monitoring a position of the magnetic tape during a servo track writing operation; and
- a controller for controlling a timing of the writing of the servo marks to the magnetic tape based on the monitored position of the magnetic tape.

19. A system as recited in claim 18, wherein the head does not move laterally when writing the servo marks onto the magnetic tape and the position of the magnetic tape changes.

20. A system for writing a servo track, comprising:
- a servo writing head for writing servo marks onto a magnetic tape;
- a device for monitoring a lateral position of the magnetic tape during a servo track writing operation; and
- a controller for controlling a timing of the writing of the servo marks to the magnetic tape based on the monitored position of the magnetic tape,
- wherein the timing of the writing of each mark determines a spacing between consecutively-written marks in a direction parallel to a direction of tape travel across the head.

* * * * *